(12) United States Patent
Soares

(10) Patent No.: US 12,291,137 B1
(45) Date of Patent: May 6, 2025

(54) SHIPPING CONTAINER HITCH AND WHEEL ATTACHMENT

(71) Applicant: Richard Soares, Swansea, MA (US)

(72) Inventor: Richard Soares, Swansea, MA (US)

( * ) Notice: Subject to any disclaimer, the term of this patent is extended or adjusted under 35 U.S.C. 154(b) by 716 days.

(21) Appl. No.: 17/666,643

(22) Filed: Feb. 8, 2022

(51) Int. Cl.
| | |
|---|---|
| *B60P 1/64* | (2006.01) |
| *B60P 7/13* | (2006.01) |
| *B60S 9/02* | (2006.01) |
| *B62D 53/06* | (2006.01) |
| *B62D 53/08* | (2006.01) |

(52) U.S. Cl.
CPC ........... *B60P 1/6481* (2013.01); *B60P 1/6409* (2013.01); *B60P 7/13* (2013.01); *B60S 9/02* (2013.01); *B62D 53/061* (2013.01); *B62D 53/068* (2013.01); *B62D 53/0842* (2013.01)

(58) Field of Classification Search
CPC ......... B60P 1/6481; B60P 1/6409; B60P 7/13; B60S 9/02; B62D 53/061; B62D 53/068; B62D 53/0842
See application file for complete search history.

(56) References Cited

U.S. PATENT DOCUMENTS

| | | | |
|---|---|---|---|
| 4,231,709 A | 11/1980 | Corsetti | |
| 4,452,555 A * | 6/1984 | Calabro | B65D 90/18 280/43.23 |
| 5,380,029 A | 1/1995 | Portilla | |
| 6,830,422 B2 | 12/2004 | Whitley | |
| D535,454 S | 1/2007 | Wareham | |
| 7,866,933 B2 | 1/2011 | Welch | |
| 8,182,193 B2 | 5/2012 | Gaudet | |
| 11,167,682 B2 * | 11/2021 | Helou, Jr. | B60K 7/0007 |
| 11,597,453 B2 * | 3/2023 | Borntrager | B60P 3/40 |
| 11,752,814 B1 * | 9/2023 | Goetsch | B60D 1/44 280/477 |
| 2016/0236610 A1 * | 8/2016 | Ross | B60P 3/40 |
| 2017/0370113 A1 * | 12/2017 | Nyce | E04B 1/34807 |
| 2018/0118542 A1 * | 5/2018 | Shelagowski | B66F 9/24 |
| 2020/0231080 A1 | 7/2020 | Weatherby | |

FOREIGN PATENT DOCUMENTS

WO 2010048713 10/2009

* cited by examiner

*Primary Examiner* — Kevin Hurley
*Assistant Examiner* — Marlon A Arce
(74) *Attorney, Agent, or Firm* — Kyle A. Fletcher, Esq.

(57) ABSTRACT

The shipping container hitch and wheel attachment comprises a hitch structure, a plurality of wheel structures, and an intermodal freight container. The hitch structure removably attaches to the intermodal freight container. Each wheel structure selected from the plurality of wheel structures removably attaches to the intermodal freight container. The hitch structure and the plurality of wheel structures temporarily modify the intermodal freight container such that intermodal freight container can be directly towed by a tractor. By directly towed is meant that the intermodal freight container forms its own trailer structure and does not require the service of a separate trailer such as a flatbed trailer. The hitch structure attaches the intermodal freight container to a tractor. The plurality of wheel structures form a chassis that allows the intermodal freight container to be towed.

13 Claims, 5 Drawing Sheets

SHIPPING CONTAINER HITCH AND WHEEL ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of modified vehicles predominantly used for transporting loads.

SUMMARY OF INVENTION

The shipping container hitch and wheel attachment comprises a hitch structure, a plurality of wheel structures, and an intermodal freight container. The hitch structure removably attaches to the intermodal freight container. Each wheel structure selected from the plurality of wheel structures removably attaches to the intermodal freight container. The hitch structure and the plurality of wheel structures temporarily modify the intermodal freight container such that intermodal freight container can be directly towed by a tractor. By directly towed is meant that the intermodal freight container forms its own trailer structure and does not require the service of a separate trailer such as a flatbed trailer. The hitch structure attaches the intermodal freight container to a tractor. The plurality of wheel structures form a chassis that allows the intermodal freight container to be towed.

These together with additional objects, features and advantages of the shipping container hitch and wheel attachment will be readily apparent to those of ordinary skill in the art upon reading the following detailed description of the presently preferred, but nonetheless illustrative, embodiments when taken in conjunction with the accompanying drawings.

In this respect, before explaining the current embodiments of the shipping container hitch and wheel attachment in detail, it is to be understood that the shipping container hitch and wheel attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shipping container hitch and wheel attachment.

It is therefore important that the claims be regarded as including such equivalent construction insofar as they do not depart from the spirit and scope of the shipping container hitch and wheel attachment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
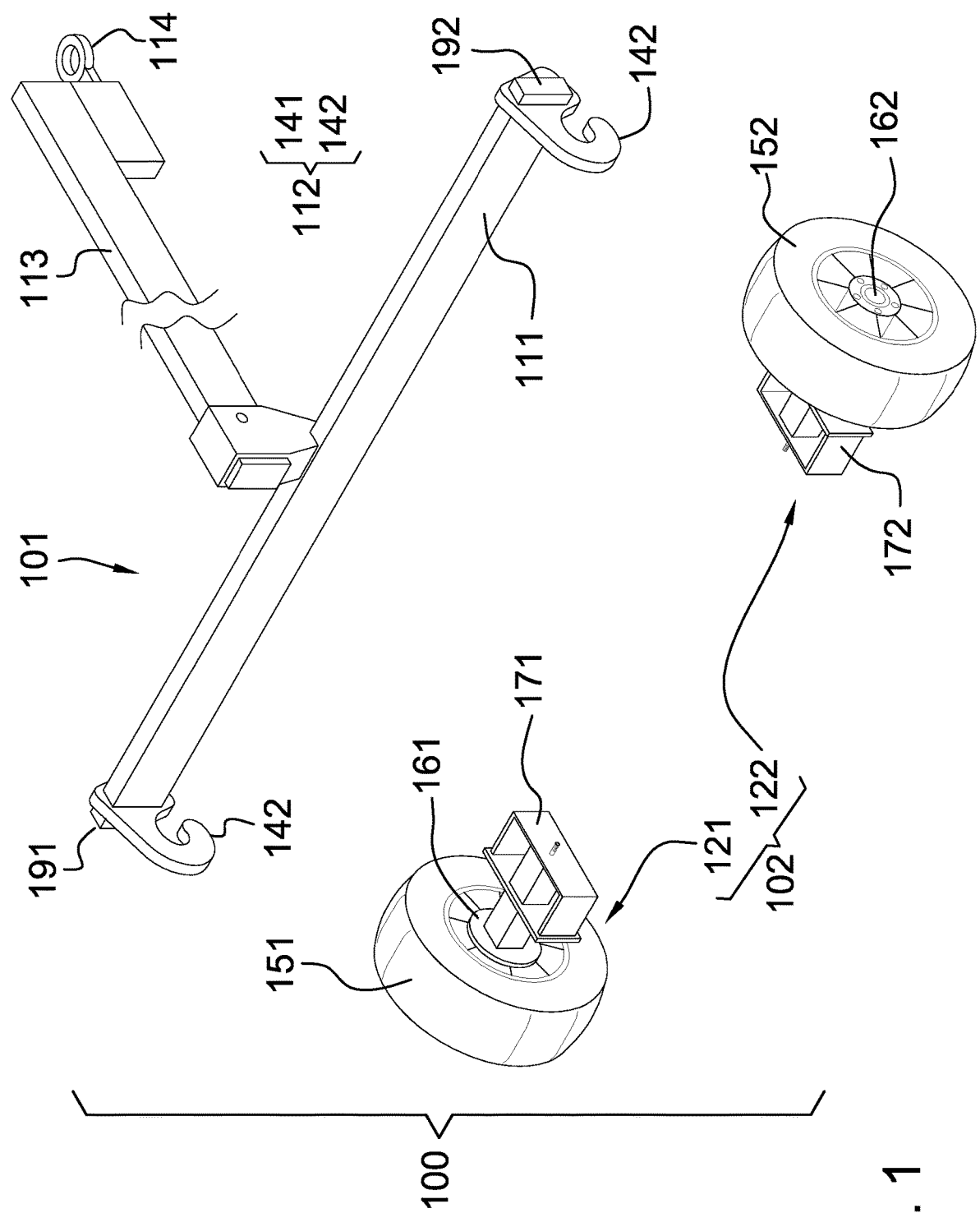
FIG. 1 is a perspective view of an embodiment of the disclosure.
Figure 2:
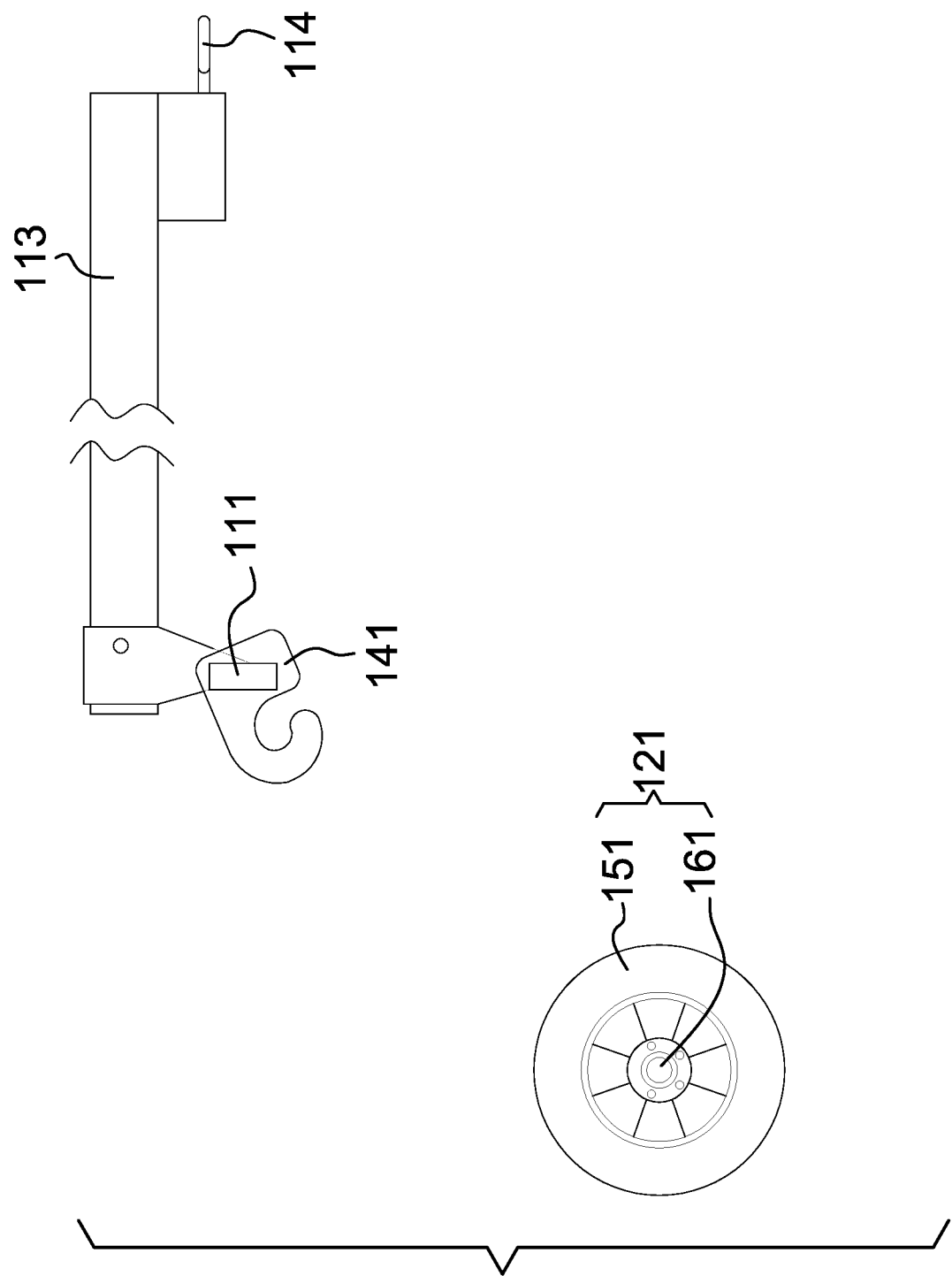
FIG. 2 is a side view of an embodiment of the disclosure.
Figure 3:
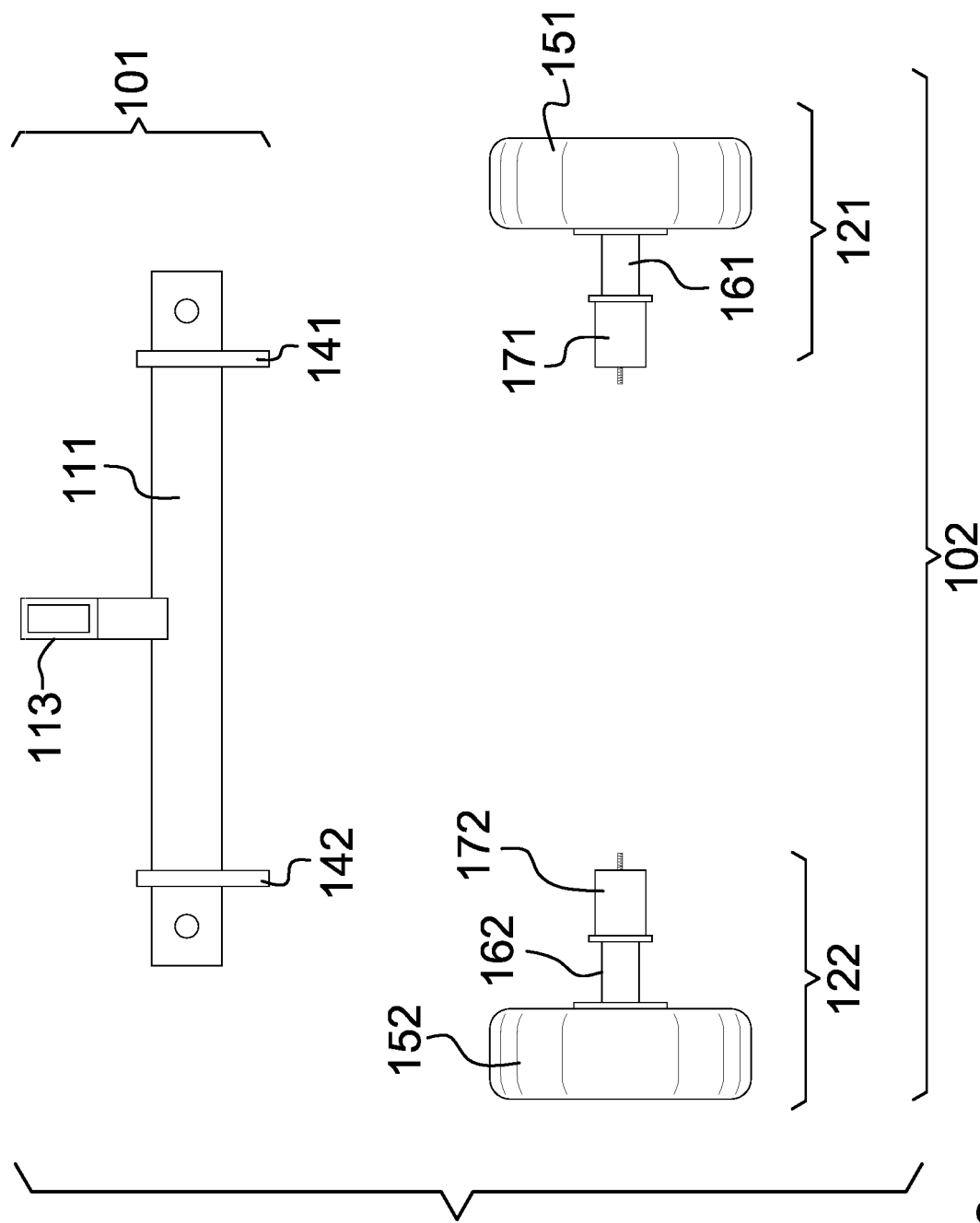
FIG. 3 is a front view of an embodiment of the disclosure.
Figure 4:
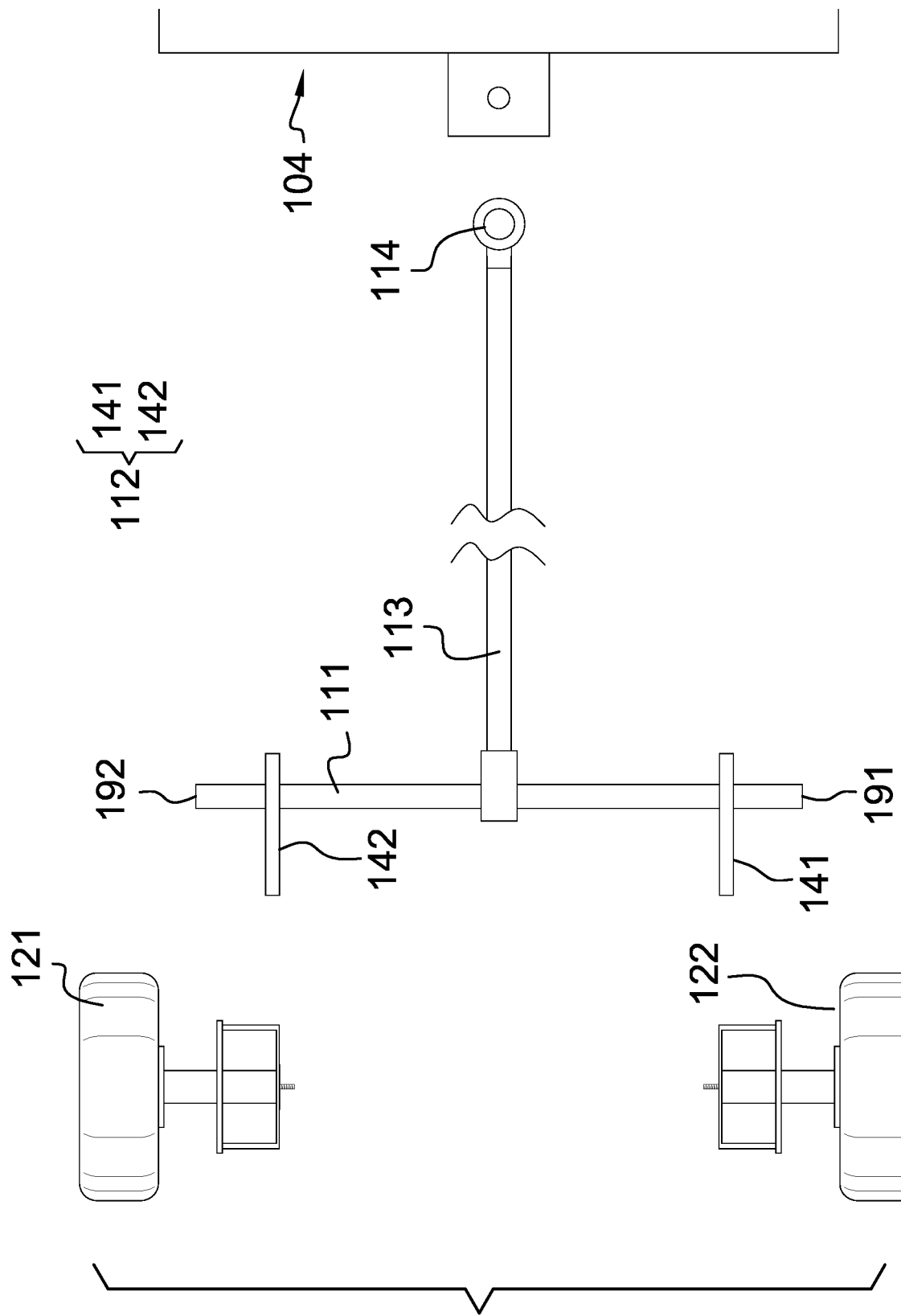
FIG. 4 is a top view of an embodiment of the disclosure.
Figure 5:
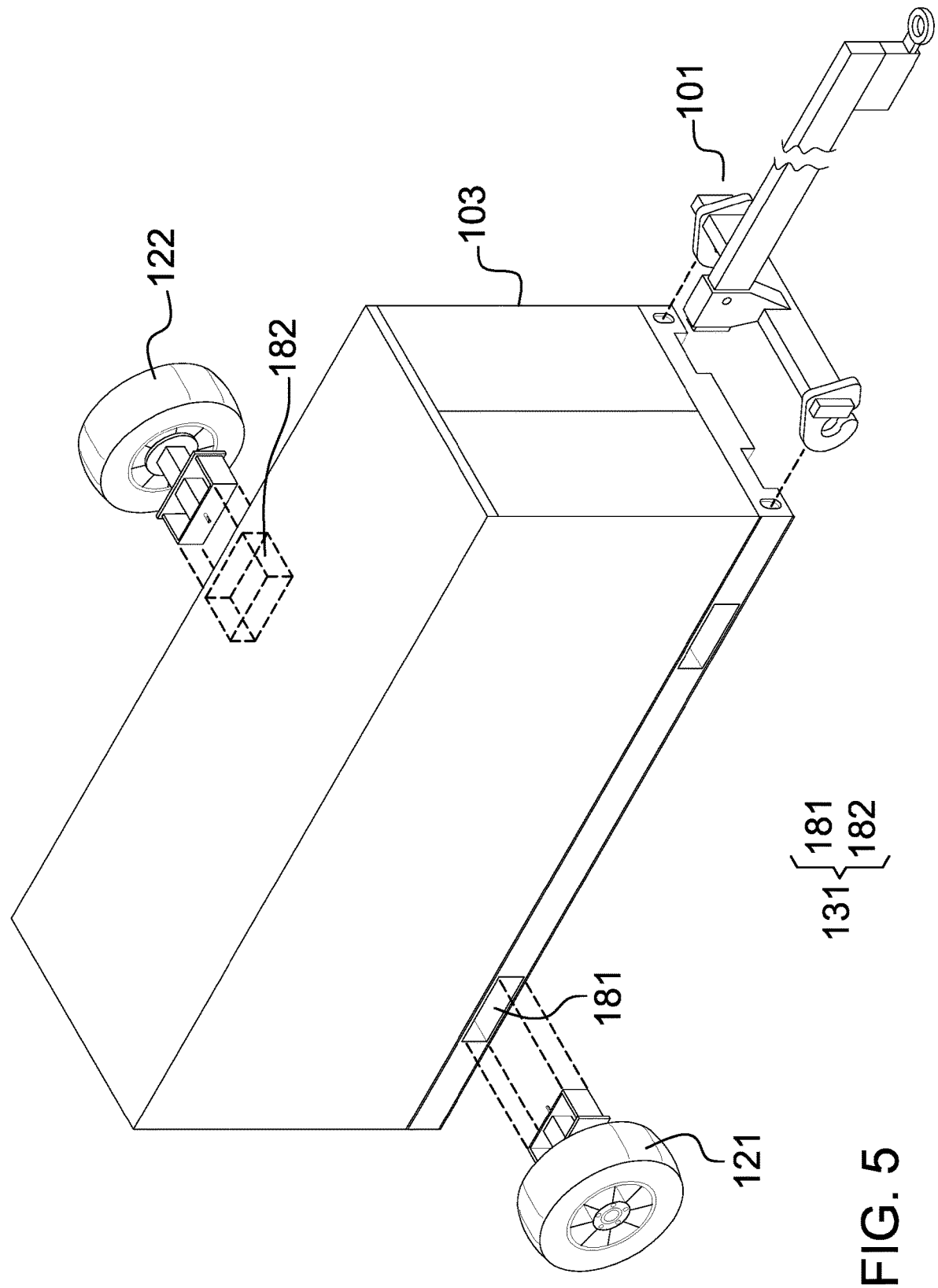
FIG. 5 is an in-use view of an embodiment of the disclosure.

Detailed reference will now be made to one or more potential embodiments of the disclosure, which are illustrated in FIGS. 1 through 5.

The shipping container hitch and wheel attachment 100 (hereinafter invention) comprises a hitch structure 101, a plurality of wheel structures 102, and an intermodal freight container 103. The hitch structure 101 removably attaches to the intermodal freight container 103. Each wheel structure selected from the plurality of wheel structures 102 removably attaches to the intermodal freight container 103. The hitch structure 101 and the plurality of wheel structures 102 temporarily modify the intermodal freight container 103 such that intermodal freight container 103 can be directly towed by a tractor 104. By directly towed is meant that the intermodal freight container 103 forms its own trailer structure and does not require the service of a separate trailer such as a flatbed trailer. The hitch structure 101 attaches the intermodal freight container 103 to a tractor 104. The plurality of wheel structures 102 form a chassis that allows the intermodal freight container 103 to be towed.

The intermodal freight container 103 is a rigid structure. The intermodal freight container 103 is a hollow structure. The intermodal freight container 103 is a containment structure. The intermodal freight container 103 forms a protected space. The intermodal freight container 103 stores cargo within the protected space. The intermodal freight container 103 further comprises a plurality of receiving slots 131.

Each receiving slot selected from the plurality of receiving slots 131 is a negative space that is formed in a lateral side of the intermodal freight container 103. Each receiving slot selected from the plurality of receiving slots 131 forms an anchor point that anchors a wheel structure selected from the plurality of wheel structures 102 to the intermodal freight container 103. There is a one to one correspondence between the plurality of receiving slots 131 and the plurality of wheel structures 102 such that each receiving slot selected from the plurality of receiving slots 131 receives a wheel structure selected from the plurality of wheel structures 102. Each wheel structure selected from the plurality of wheel structures 102 inserts into its associated receiving slot selected from the plurality of receiving slots 131.

The plurality of receiving slots 131 further comprises a right side receiving slot 181 and a left side receiving slot 182. The right side receiving slot 181 is a negative space that is formed in the right lateral side of the intermodal freight container 103. The right side receiving slot 181 forms an anchor point used to anchor the right side wheel 151 structure 121 of the plurality of wheel structures 102 to the right lateral side of the intermodal freight container 103. The left side receiving slot 182 is a negative space that is formed in the right lateral side of the intermodal freight container 103. The left side receiving slot 182 forms an anchor point used to anchor the left side wheel 152 structure 122 of the plurality of wheel structures 102 to the left lateral side of the intermodal freight container 103.

The hitch structure 101 is a mechanical structure. The hitch structure 101 is a load bearing structure. The hitch structure 101 removably attaches the intermodal freight container 103 to a tractor 104. The hitch structure 101 transfers the load of the intermodal freight container 103 to the tractor 104 during towing. The hitch structure 101 comprises a cross bar 111, a plurality of steel hooks 112, and a tongue structure 113.

The cross bar 111 is a prism shaped structure. The cross bar 111 is a rigid structure. The cross bar 111 attaches the plurality of steel hooks 112 to the tongue structure 113. The cross bar 111 transfers the load borne by the plurality of steel hooks 112 to the tongue structure 113. The cross bar 111 further comprises a right side congruent end 191 and a left side congruent end 192.

The right side congruent end 191 is the congruent end of the prism structure of the cross bar 111 that is positioned at a location proximal to the right lateral side of the intermodal freight container 103. The left side congruent end 192 is the congruent end of the prism structure of the cross bar 111 that is positioned at a location proximal to the left lateral side of the intermodal freight container 103. The left side congruent end 192 is the congruent end of the prism structure of the cross bar 111 that is distal from the right side congruent end 191.

Each steel hook selected from the plurality of steel hooks 112 is a fastening device. Each steel hook selected from the plurality of steel hooks 112 removably attaches the cross bar 111 to the anterior surface of the intermodal freight container 103. The plurality of steel hooks 112 transfer the load of the intermodal freight container 103 to the tongue structure 113 during towing. The plurality of steel hooks 112 comprises a right side steel hook 141 and a left side steel hook 142.

The right side steel hook 141 is a steel hook selected from the plurality of steel hooks 112. The right side steel hook 141 permanently attaches to the posterior lateral face of the prism structure of the cross bar 111 at a location proximal to the right side congruent end 191 of the cross bar 111. The right side steel hook 141 removably attaches the cross bar 111 to the right side of the anterior face of the intermodal freight container 103.

The left side steel hook 142 is a steel hook selected from the plurality of steel hooks 112. The left side steel hook 142 permanently attaches to the posterior lateral face of the prism structure of the cross bar 111 at a location proximal to the left side congruent end 192 of the cross bar 111. The left side steel hook 142 removably attaches the cross bar 111 to the left side of the anterior face of the intermodal freight container 103.

The tongue structure 113 is a rigid structure. The tongue structure 113 is a prism shaped structure. The tongue structure 113 is a load bearing structure. The tongue structure 113 secures the cross bar 111 to the tractor 104 such that the center axis of the prism structure of the cross bar 111 is roughly perpendicular to the primary sense of direction of the tractor 104. The tongue structure 113 forms a load bearing structure that transfers the load of the intermodal freight container 103 to the tractor 104. The tongue structure 113 permanently attaches to the cross bar 111. The tongue structure 113 removably attaches to the tractor 104. The tongue structure 113 attaches to the tractor 104 such that the center axis of the prism structure of the tongue structure 113 is roughly parallel to the primary sense of direction of the tractor 104.

The tongue structure 113 further comprises a hitch ring 114. The hitch ring 114 is a fastening device. The hitch ring 114 permanently attaches to the tongue structure 113 to form a lateral prism structure. The hitch ring 114 forms an anchor point that allows the tractor 104 to removably attach to the hitch structure 101. The hitch ring 114 is a ring shaped structure that is configured for use with a hitch that attaches to the tractor 104.

The plurality of wheel structures 102 forms a chassis. The plurality of wheel structures 102 removably attach to the intermodal freight container 103. The plurality of wheel structures 102 elevates the intermodal freight container 103 above the roads of a road network. The plurality of wheel structures 102 is a rolling structure that allows the tractor 104 to tow the intermodal freight container 103. The plurality of wheel structures 102 comprises a right side wheel 151 structure 121 and a left side wheel 152 structure 122. The right side wheel 151 structure 121 and the left side wheel 152 structure 122 combine to transfer the load path that transfers the full load of the intermodal freight container 103 to the road network.

The right side wheel 151 structure 121 is the wheel structure selected from the plurality of wheel structures 102 that removably attaches to the right side of the intermodal freight container 103. The right side wheel 151 structure 121 elevates the intermodal freight container 103 above the roads of a road network. The right side wheel 151 structure 121 is a rolling structure that allows the tractor 104 to tow the intermodal freight container 103. The right side wheel 151 structure 121 further comprises a right side wheel 151, a right side axle 161, and a right side axle 161 insert 171.

The right side wheel 151 forms the wheel of the right side wheel 151 structure 121. The right side wheel 151 is a load bearing structure. The right side wheel 151 transfers a portion of the load of the intermodal freight container 103 to the road network. The right side wheel 151 is a rotating structure. The rotation of the right side wheel 151 allows the tractor 104 to tow the intermodal freight container 103.

The right side axle 161 is a rigid structure. The right side axle 161 is a prism shaped structure. The right side axle 161 forms a mechanical structure that attaches the right side wheel 151 of the right side wheel 151 structure 121 to the right side axle 161 insert 171 of the right side wheel 151 structure 121. The right side axle 161 attaches the right side wheel 151 to the right side axle 161 insert 171 such that the right side wheel 151 rotates relative to the right side axle 161 insert 171.

The right side axle 161 insert 171 is a rigid structure. The right side axle 161 insert 171 is a mechanical structure. The right side axle 161 insert 171 removably attaches the right side wheel 151 structure 121 to the intermodal freight container 103. The right side axle 161 insert 171 physically secures the right side wheel 151 structure 121 to the right side receiving slot 181 of the intermodal freight container 103. The right side axle 161 insert 171 is geometrically similar to the negative space formed by the right side receiving slot 181 such that the right side axle 161 insert 171 inserts into the right side receiving slot 181. The right side axle 161 insert 171 locks into a fixed position within the right side receiving slot 181.

The left side wheel 152 structure 122 is the wheel structure selected from the plurality of wheel structures 102 that removably attaches to the left side of the intermodal freight container 103. The left side wheel 152 structure 122 elevates the intermodal freight container 103 above the roads of a road network. The left side wheel 152 structure 122 is a rolling structure that allows the tractor 104 to tow the intermodal freight container 103. The left side wheel 152 structure 122 further comprises a left side wheel 152, a left side axle 162, and a left side axle 162 insert 172.

The left side wheel 152 forms the wheel of the left side wheel 152 structure 122. The left side wheel 152 is a load bearing structure. The left side wheel 152 transfers a portion of the load of the intermodal freight container 103 to the road network. The left side wheel 152 is a rotating structure. The rotation of the left side wheel 152 allows the tractor 104 to tow the intermodal freight container 103.

The left side axle 162 is a rigid structure. The left side axle 162 is a prism shaped structure. The left side axle 162 forms a mechanical structure that attaches the left side wheel of the left side wheel 152 structure 122 to the left side axle 162 insert 172 of the left side wheel 152 structure 122. The left side axle 162 attaches the left side wheel 152 to the left side axle 162 insert 172 such that the left side wheel 152 rotates relative to the left side axle 162 insert 172.

The left side axle 162 insert 172 is a rigid structure. The left side axle 162 insert 172 is a mechanical structure. The left side axle 162 insert 172 removably attaches the left side wheel 152 structure 122 to the intermodal freight container 103. The left side axle 162 insert 172 physically secures the left side wheel 152 structure 122 to the left side receiving slot 182 of the intermodal freight container 103. The left side axle 162 insert 172 is geometrically similar to the negative space formed by the left side receiving slot 182 such that the left side axle 162 insert 172 inserts into the left side receiving slot 182. The left side axle 162 insert 172 locks into a fixed position within the left side receiving slot 182.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

At a Location Proximal to: As used in this disclosure, the term "at a location proximal to" identifies the position of an object selected from a group relative to an identified location such that the span of distance from the identified location and the selected object is less than the span of distance between the identified location and any object remaining in the group. Stated less formally, at a location proximal to means that the selected object is closer to the identified location than any other object selected from the group.

Barrier: As used in this disclosure, a barrier is a physical obstacle that forms a boundary between a first space and a second space. The barrier prevents the passage of an object between the first space and the second space.

Bow: As used in this disclosure, the bow refers to the anterior side of an object, vehicle, or vessel. Specifically, the bow refers to the most structure that leads the object, vehicle, or vessel into the primary sense of direction of the object vehicle, or vessel.

Cant: As used in this disclosure, a cant is an angular deviation from one or more reference lines (or planes) such as a vertical line (or plane) or a horizontal line (or plane).

Cargo: As used in this disclosure, cargo refers to one or more objects that are intended to be transported using a vehicle. The term freight is a synonym for cargo.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chassis: As used in this disclosure, a chassis is a wheeled structure that is used to transport an attached load.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space used to store and transport an object. The term containment structure is a synonym for container.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hitch: As used in this disclosure, a hitch is a fastening apparatus that attaches an unpowered vehicle, such as a trailer, to a motorized vehicle such that the motorized vehicle can tow the unpowered vehicle.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Include, But Are Not Limited To: As used in this disclosure, the term "include, but are not limited to" is a phrase used to introduce representative examples of structures that meet the requirements of the first phrase. As a first example of the use of the term "include, but are not limited to," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "include, but are not limited to," the phrase: "the chemical substance is a halogen such as chlorine or bromine" is taken to mean that either chlorine or bromine are suitable for use as the halogen but is not meant to exclude the use of fluorine or iodine.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Intermodal Freight Container: As used in this disclosure, an intermodal freight container is rigid containment structure that forms a protected space used to store and transport cargo. The intermodal freight container is designed transported using a plurality of vehicles and vessels including, but not limited to, water vessels, trains, and tractor trailer vehicles.

Inert: As used in this disclosure, inert is an adjective that is applied to an object, system, or chemical reaction. Inert means that the object, system, or chemical reaction is incapable of internal motion, internal activity or is otherwise unreactive.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Permanent: As used in this disclosure, the term permanent refers to a fundamental state, condition or location of an object, process, or arrangement that is not subject to, or expected to be, changed. A perpetual object refers to a permanent object that is expected to last over an unlimited period of time. A building such as a house or a skyscraper would be considered permanent. An ocean would be considered perpetual.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Posterior: As used in this disclosure, posterior is a term that is used to refer to the side of an object that is distal or in the opposite direction of the anterior side. When comparing two items, the posterior item is the item that is distal from the anterior of the object.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force.

Ring: As used in this disclosure, a ring is term that is used to describe a disk-like structure through which a negative space is formed through the faces of the disk-like structure. Rings are often considered loops.

Roughly: As used in this disclosure, roughly refers to a comparison between two objects. Roughly means that the difference between one or more parameters of the two compared objects are not significantly different.

Stern: As used in this disclosure, the stern refers to the posterior side of an object, vehicle, or vessel. The stern is distal from the bow along the primary sense of direction.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Temporary: As used in this disclosure, the term temporary refers to a state, condition or location of an object, process, or arrangement that is intended to last for a limited period of time. The term temporary is the opposite of permanent. The term transient refers to a temporary state or condition of an object that degrades over time. In physical processes, the term transient tends to imply a short period of time.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tire: As used in this disclosure, a tire is a solid or air filled covering for a wheel. The purpose of the tire is to absorb shocks, provide traction, and protect the wheel from wear and other damage.

Tongue: As used in this disclosure, a tongue is a shaft structure that attaches to a trailer such that the shaft structure: projects away from the trailer in a direction parallel to the primary sense of direction of the trailer. The apparatus required to hitch the trailer to a tractor mounts on the tongue.

Tow: As used in this disclosure, the term tow is used as a verb that refers to moving an object by pulling on the object with the assistance of an apparatus or device.

Tractor: As used in this disclosure, a tractor is a vehicle having a powerful diesel or gasoline powered engine that is used to tow one or more trailers.

Trailer: As used in this disclosure, a trailer is an unpowered wheeled vehicle that is towed by a powered vehicle such as a tractor.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shipping container enhancement comprising
   a hitch structure, a plurality of wheel structures, and an intermodal freight container;
   wherein the hitch structure removably attaches to the intermodal freight container;
   wherein each wheel structure selected from the plurality of wheel structures removably attaches to the intermodal freight container;
   wherein the hitch structure and the plurality of wheel structures temporarily modify the intermodal freight container such that intermodal freight container can be directly towed by a tractor;
   wherein the intermodal freight container further comprises a plurality of receiving slots;
   wherein each receiving slot selected from the plurality of receiving slots is a negative space that is formed in a lateral side of the intermodal freight container;
   wherein each receiving slot selected from the plurality of receiving slots forms an anchor point that anchors a wheel structure selected from the plurality of wheel structures to the intermodal freight container;
   wherein the hitch structure comprises a cross bar, a plurality of steel hooks, and a tongue structure;
   wherein the cross bar attaches the plurality of steel hooks to the tongue structure.

2. The shipping container enhancement according to claim 1
   wherein by directly towed is meant that the intermodal freight container forms its own trailer structure and does not require the service of a separate trailer such as a flatbed trailer;
   wherein the hitch structure attaches the intermodal freight container to a tractor;
   wherein the plurality of wheel structures form a chassis that allows the intermodal freight container to be towed.

3. The shipping container enhancement according to claim 2
   wherein the intermodal freight container is a rigid structure;
   wherein the intermodal freight container is a hollow structure;
   wherein the intermodal freight container is a containment structure;
   wherein the intermodal freight container forms a protected space;
   wherein the intermodal freight container stores cargo within the protected space;
   wherein there is a one to one correspondence between the plurality of receiving slots and the plurality of wheel structures such that each receiving slot selected from the plurality of receiving slots receives a wheel structure selected from the plurality of wheel structures;
   wherein each wheel structure selected from the plurality of wheel structures inserts into its associated receiving slot selected from the plurality of receiving slots.

4. The shipping container enhancement according to claim 3
   wherein the hitch structure is a mechanical structure;
   wherein the hitch structure is a load bearing structure;
   wherein the hitch structure removably attaches the intermodal freight container to a tractor;
   wherein the hitch structure transfers the load of the intermodal freight container to the tractor during towing.

5. The shipping container enhancement according to claim 4
   wherein the plurality of receiving slots further comprises a right side receiving slot and a left side receiving slot;
   wherein the right side receiving slot is a negative space that is formed in the right lateral side of the intermodal freight container;
   wherein the right side receiving slot forms an anchor point used to anchor the right side wheel structure of the plurality of wheel structures to the right lateral side of the intermodal freight container;
   wherein the left side receiving slot is a negative space that is formed in the right lateral side of the intermodal freight container;
   wherein the left side receiving slot forms an anchor point used to anchor the left side wheel structure of the plurality of wheel structures to the left lateral side of the intermodal freight container.

6. The shipping container enhancement according to claim 5
   wherein the plurality of wheel structures forms a chassis;
   wherein the plurality of wheel structures removably attach to the intermodal freight container;
   wherein the plurality of wheel structures elevates the intermodal freight container above the roads of a road network;
   wherein the plurality of wheel structures is a rolling structure that allows the tractor to tow the intermodal freight container.

7. The shipping container enhancement according to claim 6
wherein the cross bar is a prism shaped structure;
wherein the cross bar is a rigid structure;
wherein the cross bar transfers the load borne by the plurality of steel hooks to the tongue structure;
wherein the cross bar further comprises a right side congruent end and a left side congruent end;
wherein the right side congruent end is the congruent end of the prism structure of the cross bar that is positioned at a location proximal to the right lateral side of the intermodal freight container;
wherein the left side congruent end is the congruent end of the prism structure of the cross bar that is positioned at a location proximal to the left lateral side of the intermodal freight container;
wherein the left side congruent end is the congruent end of the prism structure of the cross bar that is distal from the right side congruent end.

8. The shipping container enhancement according to claim 7
wherein each steel hook selected from the plurality of steel hooks is a fastening device;
wherein each steel hook selected from the plurality of steel hooks removably attaches the cross bar to the anterior surface of the intermodal freight container;
wherein the plurality of steel hooks transfer the load of the intermodal freight container to the tongue structure during towing.

9. The shipping container enhancement according to claim 8
wherein the tongue structure is a rigid structure;
wherein the tongue structure is a prism shaped structure;
wherein the tongue structure is a load bearing structure;
wherein the tongue structure secures the cross bar to the tractor such that the center axis of the prism structure of the cross bar is roughly perpendicular to the primary sense of direction of the tractor;
wherein the tongue structure forms a load bearing structure that transfers the load of the intermodal freight container to the tractor;
wherein the tongue structure permanently attaches to the cross bar;
wherein the tongue structure removably attaches to the tractor;
wherein the tongue structure attaches to the tractor such that the center axis of the prism structure of the tongue structure is roughly parallel to the primary sense of direction of the tractor.

10. The shipping container enhancement according to claim 9
wherein the plurality of wheel structures comprises a right side wheel structure and a left side wheel structure;
wherein the right side wheel structure and the left side wheel structure combine to transfer the load path that transfers the full load of the intermodal freight container to the road network;
wherein the right side wheel structure is the wheel structure selected from the plurality of wheel structures that removably attaches to the right side of the intermodal freight container;
wherein the right side wheel structure elevates the intermodal freight container above the roads of a road network;
wherein the right side wheel structure is a rolling structure that allows the tractor to tow the intermodal freight container;
wherein the left side wheel structure is the wheel structure selected from the plurality of wheel structures that removably attaches to the left side of the intermodal freight container;
wherein the left side wheel structure elevates the intermodal freight container above the roads of a road network;
wherein the left side wheel structure is a rolling structure that allows the tractor to tow the intermodal freight container.

11. The shipping container enhancement according to claim 10
wherein the tongue structure further comprises a hitch ring;
wherein the hitch ring is a fastening device;
wherein the hitch ring permanently attaches to the tongue structure to form a lateral prism structure;
wherein the hitch ring forms an anchor point that allows the tractor to removably attach to the hitch structure.

12. The shipping container enhancement according to claim 11
wherein the plurality of steel hooks comprises a right side steel hook and a left side steel hook;
wherein the right side steel hook is a steel hook selected from the plurality of steel hooks;
wherein the right side steel hook permanently attaches to the posterior lateral face of the prism structure of the cross bar at a location proximal to the right side congruent end of the cross bar;
wherein the right side steel hook removably attaches the cross bar to the right side of the anterior face of the intermodal freight container;
wherein the left side steel hook is a steel hook selected from the plurality of steel hooks;
wherein the left side steel hook permanently attaches to the posterior lateral face of the prism structure of the cross bar at a location proximal to the left side congruent end of the cross bar;
wherein the left side steel hook removably attaches the cross bar to the left side of the anterior face of the intermodal freight container.

13. The shipping container enhancement according to claim 12
wherein the right side wheel structure further comprises a right side wheel, a right side axle, and a right side axle insert;
wherein the right side wheel forms the wheel of the right side wheel structure;
wherein the right side wheel is a load bearing structure;
wherein the right side wheel transfers a portion of the load of the intermodal freight container to the road network;
wherein the right side wheel is a rotating structure;
wherein the rotation of the right side wheel allows the tractor to tow the intermodal freight container;
wherein the right side axle is a rigid structure;
wherein the right side axle is a prism shaped structure;
wherein the right side axle forms a mechanical structure that attaches the right side wheel of the right side wheel structure to the right side axle insert of the right side wheel structure;
wherein the right side axle attaches the right side wheel to the right side axle insert such that the right side wheel rotates relative to the right side axle insert;
wherein the right side axle insert is a rigid structure;
wherein the right side axle insert is a mechanical structure;

wherein the right side axle insert removably attaches the right side wheel structure to the intermodal freight container;

wherein the right side axle insert physically secures the right side wheel structure to the right side receiving slot of the intermodal freight container;

wherein the right side axle insert is geometrically similar to the negative space formed by the right side receiving slot such that the right side axle insert inserts into the right side receiving slot;

wherein the right side axle insert locks into a fixed position within the right side receiving slot;

wherein the left side wheel structure further comprises a left side wheel, a left side axle, and a left side axle insert;

wherein the left side wheel forms the wheel of the left side wheel structure;

wherein the left side wheel is a load bearing structure;

wherein the left side wheel transfers a portion of the load of the intermodal freight container to the road network;

wherein the left side wheel is a rotating structure;

wherein the rotation of the left side wheel allows the tractor to tow the intermodal freight container;

wherein the left side axle is a rigid structure;

wherein the left side axle is a prism shaped structure;

wherein the left side axle forms a mechanical structure that attaches the left side wheel of the left side wheel structure to the left side axle insert of the left side wheel structure;

wherein the left side axle attaches the left side wheel to the left side axle insert such that the left side wheel rotates relative to the left side axle insert;

wherein the left side axle insert is a rigid structure;

wherein the left side axle insert is a mechanical structure;

wherein the left side axle insert removably attaches the left side wheel structure to the intermodal freight container;

wherein the left side axle insert physically secures the left side wheel structure to the left side receiving slot of the intermodal freight container;

wherein the left side axle insert is geometrically similar to the negative space formed by the left side receiving slot such that the left side axle insert inserts into the left side receiving slot;

wherein the left side axle insert locks into a fixed position within the left side receiving slot.

* * * * *